United States Patent [19]

Jänchen

[11] 4,140,399
[45] Feb. 20, 1979

[54] MONOCHROMATOR FOR SIMULTANEOUS SELECTION AND UTILIZATION OF TWO WAVE-LENGTHS

[75] Inventor: Dieter E. Jänchen, Muttenz, Switzerland

[73] Assignee: CAMAG Chemie-Erzeugnisse und Adsorptionstechnik AG, Muttenz, Switzerland

[21] Appl. No.: 765,395

[22] Filed: Feb. 3, 1977

[30] Foreign Application Priority Data

Feb. 6, 1976 [DE] Fed. Rep. of Germany ....... 2604666

[51] Int. Cl.² ............................................... G01J 3/18
[52] U.S. Cl. .................................................... 356/332
[58] Field of Search ....................... 356/80, 81, 82–84, 356/98–101

[56] References Cited

U.S. PATENT DOCUMENTS

| | | | |
|---|---|---|---|
| 2,572,119 | 10/1951 | Dieke | 356/81 |
| 4,012,147 | 3/1977 | Walrafen | 356/99 X |

Primary Examiner—F. L. Evans
Attorney, Agent, or Firm—Gerald J. Ferguson, Jr.; Joseph J. Baker

[57] ABSTRACT

A monochromator for the simultaneous selection and utilization of two wavelengths of small and constant band width, whereby the wavelengths may be selected and rapidly changed as desired. The monochromator is particularly suitable for the simultaneous scanning of a chromatogram (e.g. a thin-layer chromatogram) with two wavelengths to determine the concentration of a certain material independently of disturbing influences of the matrix. This is done by photosensors which are adapted to be led on pivot arms on a circular arc about the element dispersing the light.

4 Claims, 2 Drawing Figures

MONOCHROMATOR FOR SIMULTANEOUS SELECTION AND UTILIZATION OF TWO WAVE-LENGTHS

BACKGROUND OF THE INVENTION

1. Field of the Invention

Monochromators are mainly used in photoelectric spectrometers, sometimes called spectrophotometers. A monochromator serves to disperse polychromatic light for the purpose of selecting light of more or less uniform wavelength — monochromatic light — and transmitting this light further in the apparatus for measuring purposes.

The actual spectral dispersion in the monochromator is done either by a prism or be a diffraction grating. When reference is made hereinafter to a "grating", it is to be understood that fundamentally a prism can be used instead.

2. Description of the Prior Art

A conventional monochromator consists of a light entry aperture, the grating, the exit aperture and lenses and/or mirrors for focusing and directing the light beams.

In known monochromators the wavelength selection of the monochromatic light is effected by turning the dispersing element with respect to the incident light beam in such a manner that the light of desired wavelength is incident exactly on the exit aperture. Light of all other wavelengths is absorbed by the walls of the monochromator, i.e., is lost.

For certain purposes photoelectric spectrometers require light of two different monochromatic wavelengths. An example of this is a chromatogram spectrometer in which the chromatogram is scanned with light of two different wavelengths. The one wavelength is chosen so that it lies in the region of the absorption maximum of the substance to be investigated and the other so that it detects the disturbing influences of the chromatogram matrix. The signals of the two wavelengths are correlated by means of electronic processors so that an optimum signal/noise ratio and thus a high measuring accuracy is achieved.

In known "two-wavelength apparatuses" of this type two monochromators were used for producing the two monochromatic radiations. For further considerations it is of no consequence whether for this purpose light from two radiation sources is used, or light from only one source divided by a mirror type beam splitter or equivalent means, which is the usual case, or whether the beam splitting is effected prior or after passage through the medium to be investigated. In each case, two monochromators are required in these known apparatuses.

U.S. Pat. No. 3,880,523 discloses an apparatus referred to as a colorimeter in which a light dispersing diffraction grating lies opposite a rectilinear screen receiving the spectrum. This screen has a number of larger and smaller circular openings to which light conducting elements leading to a detector head can be selectively connected. Since the openings must have a certain spacing with respect to each other it is not possible to pick up spectral wavelength ranges incident on the intermediate spaces. In addition, the light yield is not uniform because of non-uniform angles of incidence of the light beam. The band width also changes depending on the angle of incidence of the beam on the holes.

All these factors prevent uniform or easily comparable measuring results.

In a second embodiment of this known apparatus a single light guide element is movable transversely across the straight screen receiving the spectrum. In this case as well, uniform measuring results cannot be obtained because the beam impinges on the entry gap of this single light guide element at different angles for various positions.

SUMMARY OF THE INVENTION

The invention avoids the disadvantages of the known apparatuses.

It is therefore an object of the invention to provide a monochromator which is simple in design and handling and permits an exactly defined selection of two wavelength ranges from the entire spectrum with maximum light yield. A further object of the invention is to provide a monochromator in which the wavelength range selected can be changed rapidly without affecting its relative light intensity. Finally, the invention is to permit automatic operation of the apparatus.

According to the invention, the light guide element or elements are arranged each on a pivot arm which guides the light guide element on a circular arc about the element dispersing the light. Each angular position of a pivot arm then corresponds to a predetermined wavelength setting.

In one embodiment of the invention the former manner of rotating the diffraction grating for setting the wavelength can be combined with a light guide element on a pivot arm picking up the second wavelength whilst the first wavelength is detected by a fixed exit aperture. This arrangement may have advantages in cases in which a beam of the one wavelength must be further transmitted over an extended light path whilst the intensity of the other wavelength is to be measured by a photosensor mounted on the pivot arm, e.g. for reference purposes.

DESCRIPTION OF THE DRAWINGS

In FIG. 1 the incident polychromatic light 1 impinges on the fixed grating 2. The spectral dispersion is distributed across the arc 3. Along the latter the two fibre optic elements 4 and 4' serving as light guide elements may be guided by means of the pivot arms 5 and 5'. The pivot arms are moved by stepping motors 6 and 6', pushrods 7 and 7' and pins 8 and 8' as well as return springs 9 and 9'.

Figure 1:
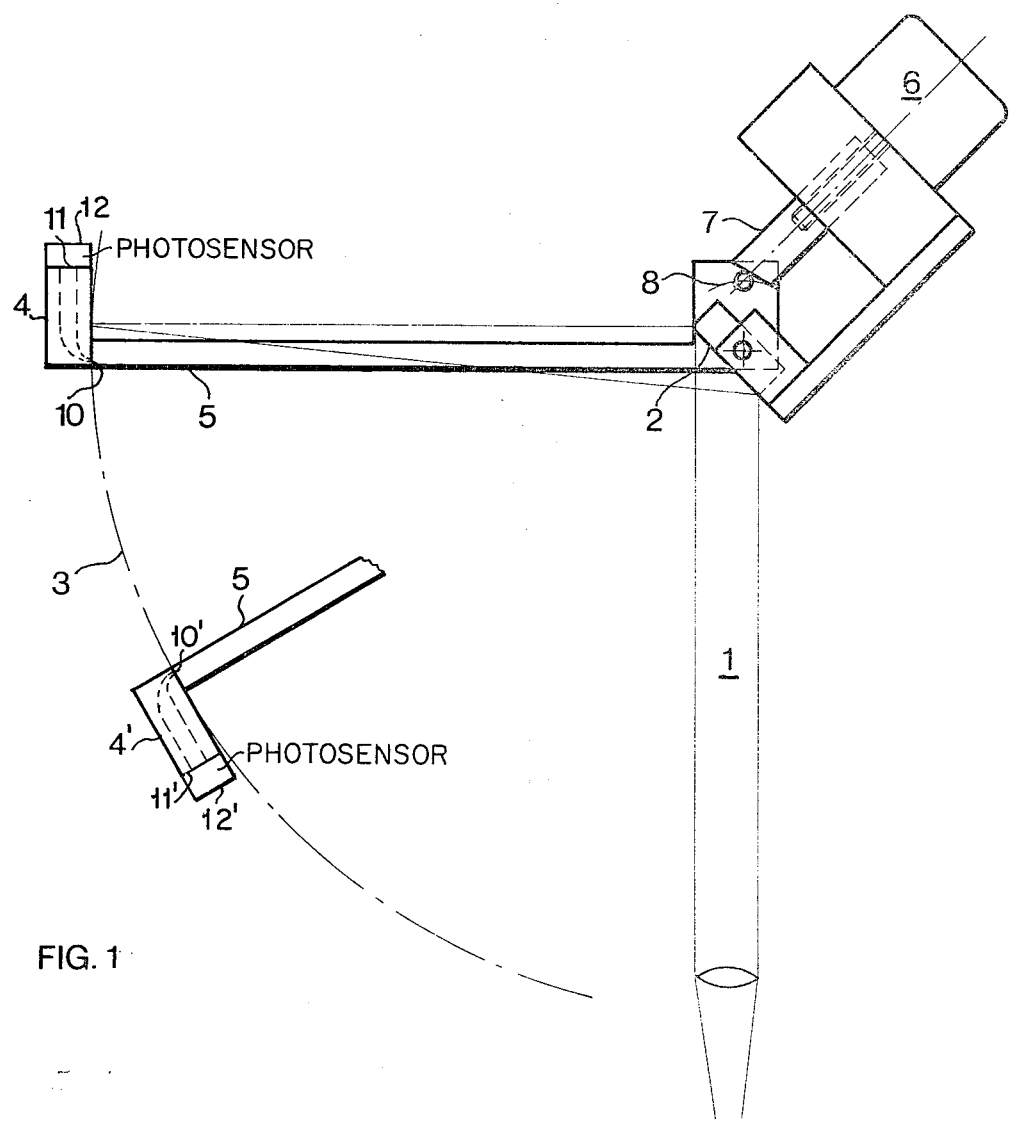
FIGS. 1 and 2 of the drawings show diagrammatically an example of embodiment of the invention in plan view and in perspective view, respectively.
Figure 2:
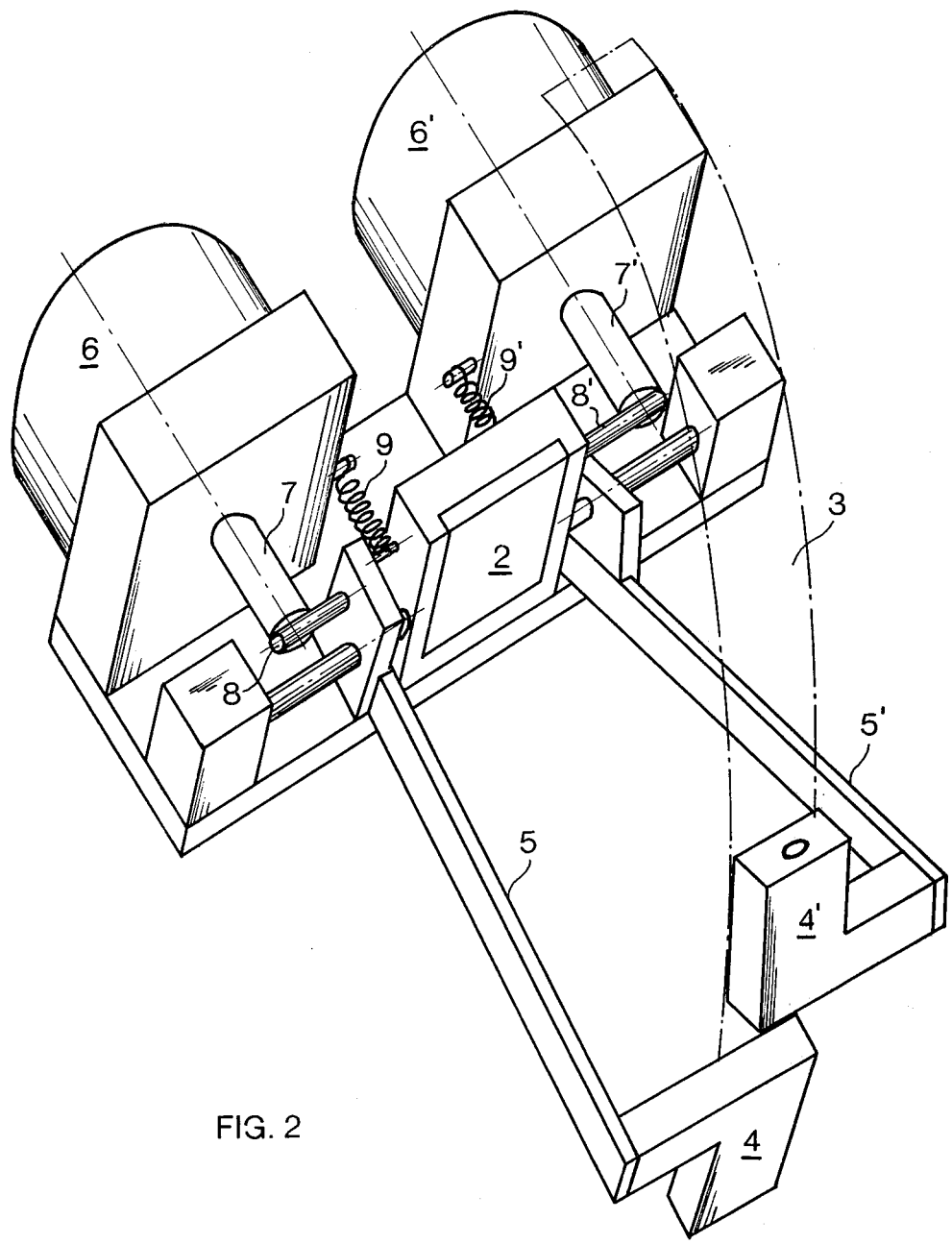

Near their one edge the fibre optical elements 4 and 4' have a narrow entry gap 10 and 10'. The fibre optical light guides widen toward the other sides 11 and 11' on which photosensors 12 and 12' are mounted as shown in FIG. 1. The two fibre optic elements 4, 4' are arranged on the pivot arms in such a manner that their sides adjacent the entry gaps face each other so that the distance between the wavelengths to be tapped simultaneously can be kept as small as desired, e.g. a few nanometers.

The band width of the respective monochromatic radiation is determined by the width of the entry gap of the light guide element. The band width may be reduced by mechanical means, e.g. by a mask.

What is claimed is:

1. A monochromator utilizing two different wavelengths comprising an element dispersing incident polychromatic light, at least two light guide elements where each has an entry gap and an exit point, moving means for moving the entry gap of said light guide elements across the dispersed spectrum of said incident polychromatic light to select two narrow wavelength ranges respectively corresponding to the positions of said entry gaps of the light guide elements, two photosensors, the said exit points of said two light guide elements being respectively connected to said two photosensors, said moving means including two pivot arms on which are respectively disposed said light guide elements, said pivot arms being so pivoted about respective axes located in the approximate vicinity of the element dispersing the incident polychromatic light that the pivot arms rotate the entry gaps of said light guide elements to different positions along a circular arc about the element dispersing the incident polychromatic light, said two photosensors being respectively mounted on the ends of said pivot arms removed from said axes.

2. A monochromator according to claim 1, where the width of the entry gap of each light guide element corresponds to the spectral band width of the selected wavelength and where two adjacent light guide elements are disposed on said pivot arms so that their sides adjacent the entry gaps are facing each other.

3. A monochromator according to claim 1 including a motor for driving said pivot arms.

4. A monochromator as in claim 3 where said motor is a stepping motor.

* * * * *